United States Patent
Hu et al.

(10) Patent No.: US 7,517,454 B2
(45) Date of Patent: Apr. 14, 2009

(54) METHOD FOR TREATING WASTEWATER CONTAINING ACTIVE SLUDGE

(75) Inventors: Yen-Jung Hu, Tainan (TW); Hsi-Yu Chen, Tainan (TW); Wen-Chun Hwang, Tainan (TW)

(73) Assignee: Kang Na Hsuing Enterprise Co., Ltd. (TW)

(*) Notice: Subject to any disclaimer, the term of this patent is extended or adjusted under 35 U.S.C. 154(b) by 0 days.

(21) Appl. No.: 11/879,874

(22) Filed: Jul. 19, 2007

(65) Prior Publication Data

US 2008/0099398 A1 May 1, 2008

(30) Foreign Application Priority Data

Oct. 26, 2006 (CN) .......................... 2006 1 0136528

(51) Int. Cl.
 *C02F 3/00* (2006.01)
(52) U.S. Cl. .................... 210/620; 210/483; 210/767
(58) Field of Classification Search ................ 210/620, 210/767, 483
 See application file for complete search history.

(56) References Cited

U.S. PATENT DOCUMENTS

| | | | | |
|---|---|---|---|---|
| 3,962,087 | A * | 6/1976 | Hartmann | 210/150 |
| 5,451,317 | A * | 9/1995 | Ishida et al. | 210/332 |
| 5,482,625 | A * | 1/1996 | Shimizu et al. | 210/321.84 |
| 6,355,167 | B1 * | 3/2002 | Wensauer | 210/232 |
| 2003/0192825 | A1 * | 10/2003 | Chang et al. | 210/483 |
| 2004/0226883 | A1 | 11/2004 | Hu et al. | |
| 2006/0086655 | A1 * | 4/2006 | Agawa et al. | 210/348 |

FOREIGN PATENT DOCUMENTS

| | | |
|---|---|---|
| JP | 10-314791 | 2/1998 |
| JP | 10128358 A * | 5/1998 |
| JP | 11290889 A * | 10/1999 |
| JP | 2000-246018 | 9/2000 |
| JP | 2005-218909 | 8/2005 |

OTHER PUBLICATIONS

Min-Chao Chang, Ren-Yang Horng, Hsin Shao, and Yen-Jung Hu, "Performance and Filtration Characteristics of Non-woven Membranes Used in a Submerged membrane Bioreactor for Synthetic Wastewater Treatment", Deslination, Elsevier, Amsterdam, NL, vol. 191, Nos. 1-3, May 10, 2006, pp. 8-15.

Search Report of corresponding EPO Patent Application No. 07019030.1, dated Feb. 28, 2008.

* cited by examiner

*Primary Examiner*—Chester T Barry
(74) *Attorney, Agent, or Firm*—Bliss McGlynn, P.C.

(57) ABSTRACT

A method includes: disposing a filter into a body of wastewater containing active sludge, the filter including a supporting member having an outlet, and a filter media enclosing the supporting member and supported by the supporting member so as to have a predetermined firm shape, the filter media including a non-woven substrate and a fibrous filtering layer attached to the non-woven substrate and having a pore diameter ranging from 0.001 to 15 μm and a layer thickness ranging from 10 to 200 μm, the fibrous filtering layer being made from fibers having a fiber diameter ranging from 20 to 1000 nm; and driving the wastewater to pass through the filter using a pump connected to the outlet of the supporting member of the filter.

7 Claims, 3 Drawing Sheets

METHOD FOR TREATING WASTEWATER CONTAINING ACTIVE SLUDGE

CROSS-REFERENCE TO RELATED APPLICATION

This application claims priority of China Application No. 200610136528.7, filed on Oct. 26, 2006.

BACKGROUND OF THE INVENTION

1. Field of the Invention

This invention relates to a method for treating wastewater containing active sludge, more particularly to a method using a filter media for treating wastewater containing active sludge.

2. Description of the Related Art

Solid-liquid separation membrane bioreactors have been used in wastewater treatment. The membranes employed in the membrane bioreactors can be ultra-filtration membranes or micro-filtration membranes based on the actual requirements for separating bio-sludge thus formed from the bio-treated wastewater. Since the concentration of the sludge in a body of the bio-treated wastewater is relatively high, the membrane tends to be easily blocked by the sludge.

Non-woven materials have been used for the membranes. However, since the non-woven material is formed of a net-like structure of stacked fibers, particles present in the wastewater are easily trapped in pores in the net-like structure of the stacked fibers. As a consequence, undesired fouling can easily occur, thereby considerably lowering the membrane flux of the membrane. To alleviate fouling, a porous polymeric coating applied to a non-woven substrate has been proposed. However, since the polymeric coating is porous, its mechanical strength is relatively poor. Moreover, the polymeric coating has a tendency to peel from the non-woven substrate.

SUMMARY OF THE INVENTION

Therefore, the object of the present invention is to provide a method using a filter media that can overcome the aforesaid drawbacks of the prior art.

According to this invention, there is provided a method for treating wastewater containing active sludge. The method comprises: disposing a filter into a body of wastewater containing active sludge, the filter including a supporting member having an outlet, and a filter media enclosing the supporting member and supported by the supporting member so as to have a predetermined firm shape, the filter media including a non-woven substrate and a fibrous filtering layer attached to the non-woven substrate and having a pore diameter ranging from 0.001 to 15 μm and a layer thickness ranging from 10 to 200 μm, the fibrous filtering layer being made from fibers having a fiber diameter ranging from 20 to 1000 nm; and driving the wastewater to pass through the filter using a pump connected to the outlet of the supporting member of the filter.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
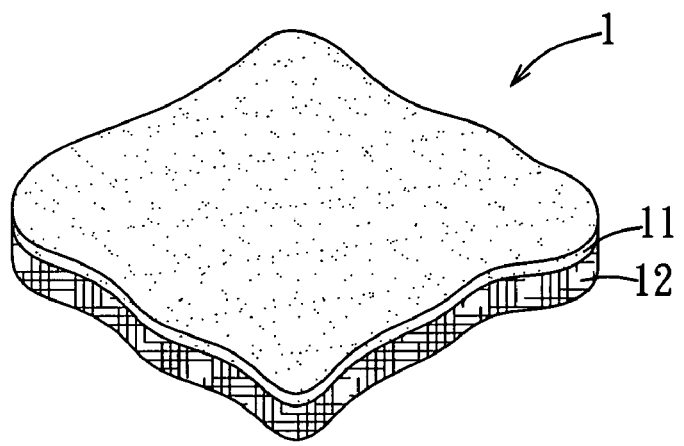
FIG. 1 is a fragmentary sectional view of the preferred embodiment of a filter media according to this invention.

Before the present invention is described in greater detail with reference to the accompanying preferred embodiments, it should be noted herein that like elements are denoted by the same reference numerals throughout the disclosure.

FIG. 1 illustrates the preferred embodiment of a filter media 1 according to this invention. The filter media 1 includes: a non-woven substrate 12; and a fibrous filtering layer 11 attached to the non-woven substrate 12 and having a pore diameter ranging from 0.001 to 15 μm and a layer thickness ranging from 10 to 200 μm. The fibrous filtering layer 11 is made from fibers having a fiber diameter ranging from 20 to 1000 nm.

The fibrous filtering layer 11 is preferably made from hydrophobic polymer selected from the group consisting of polytetrafluoroethylene (PTFE), polyethylene (PE), and polypropylene (PP), and is more preferably made from PTFE.

Preferably, the fiber diameter of the fibers of the fibrous filtering layer 11 ranges from 50 to 300 nm, and the layer thickness of the fibrous filtering layer 11 ranges from 10 to 80 μm.

The fibrous filtering layer 11 is formed first and is subsequently attached to the non-woven substrate 12 using thermal bonding techniques. In this embodiment, only one fibrous filtering layer 11 is attached to the non-woven substrate 12. However, a stack of the fibrous filtering layers 11 can be formed prior to attachment to the non-woven substrate 12. Alternatively, the fibrous filtering layer(s) 11 can be attached to the non-woven substrate 12 using electrostatic spinning techniques.

The non-woven substrate 12 is preferably made from a material selected from the group consisting of polypropylene, polyethylene, polybutylene terephthalate, polyethylene terephthalate, and combinations thereof, and has a pore diameter ranging from 1 to 50 μm, and a bulk density ranging from 10 to 1000 grams per square meter.

Figure 2:
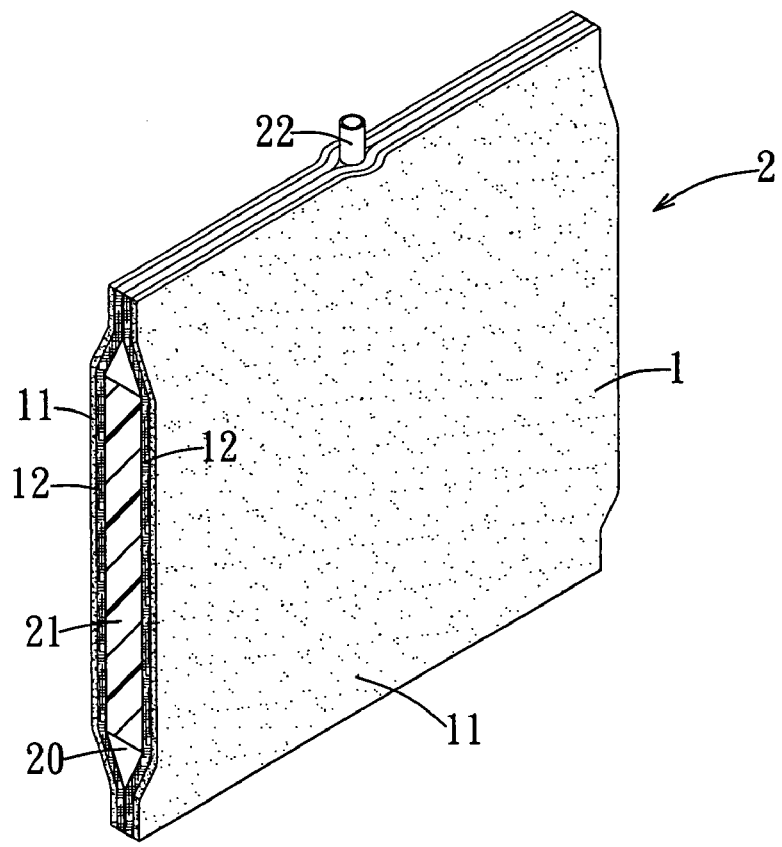
FIG. 2 is a perspective partly sectional view of the first preferred embodiment of a flat sheet filter formed from the filter media of FIG. 1 according to this invention.

FIG. 2 illustrates the first preferred embodiment of a flat sheet filter 2 formed from the filter medial of FIG. 1 according to this invention. The filter 2 includes a supporting member 21 and the filter media 1 enclosing the supporting member 21 and supported by the supporting member 21 so as to have a predetermined firm shape.

In this embodiment, the supporting member 21 is in the form of a rectangular net. The non-woven substrate 12 is disposed at an inner side of the filter 2 and contacts the supporting member 21, whereas the fibrous filtering layer 11 is disposed at an outer side of the filter 2. The filter media 1 and the supporting member 21 cooperatively define a chamber 20 therebetween. An outlet 22 extends sealingly into the chamber 20 for connecting to a pump (not shown). In use, filtrate passes through the filtering layer 11 and the non-woven substrate 12 in sequence and into the chamber 20 and is then discharged through the outlet 22.

Figure 3:
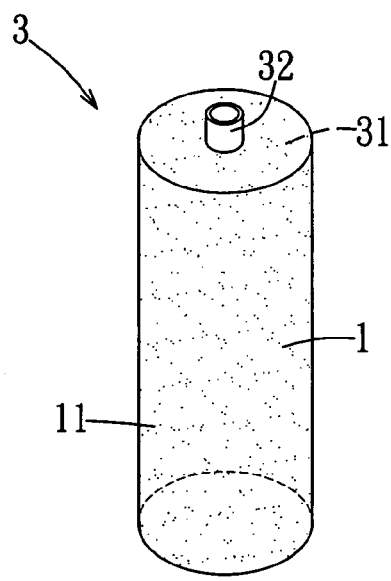
FIG. 3 is a perspective view of the second preferred embodiment of the cylindrical cartridge filter according to this invention.

FIG. 3 illustrates the second preferred embodiment of a cylindrical cartridge filter 3 formed from the filter media 1 of FIG. 1 according to this invention. The cylindrical cartridge filter 3 includes a cylindrical supporting member 31 enclosed by the filter media 1 and formed with an outlet 32 for connecting to a pump (not shown). In this embodiment, the cylindrical supporting member 31 is hollow and perforated so as to permit passage of filtrate thereinto and subsequent discharge of the filtrate through the outlet 32.

Figure 4:
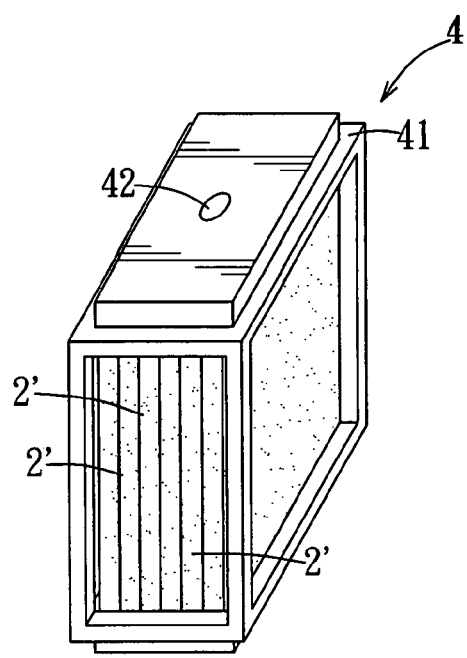
FIG. 4 is a perspective view of the third preferred embodiment of the flat sheet module according to this invention.

FIG. 4 illustrates the third preferred embodiment of a flat sheet module 4 formed from the filter media 1 of FIG. 1 according to this invention. The flat sheet module 4 includes a housing 41 serving as the above supporting member and formed with an outlet 42 for connecting to a pump (not shown) and a plurality of stacked flat sheet filter elements 2', each of which takes the form similar to that shown in FIG. 2. In use, filtrate passes through the stacked flat sheet filter elements 2' from one end to the other end thereof and is discharged through the outlet 42.

Figure 5:
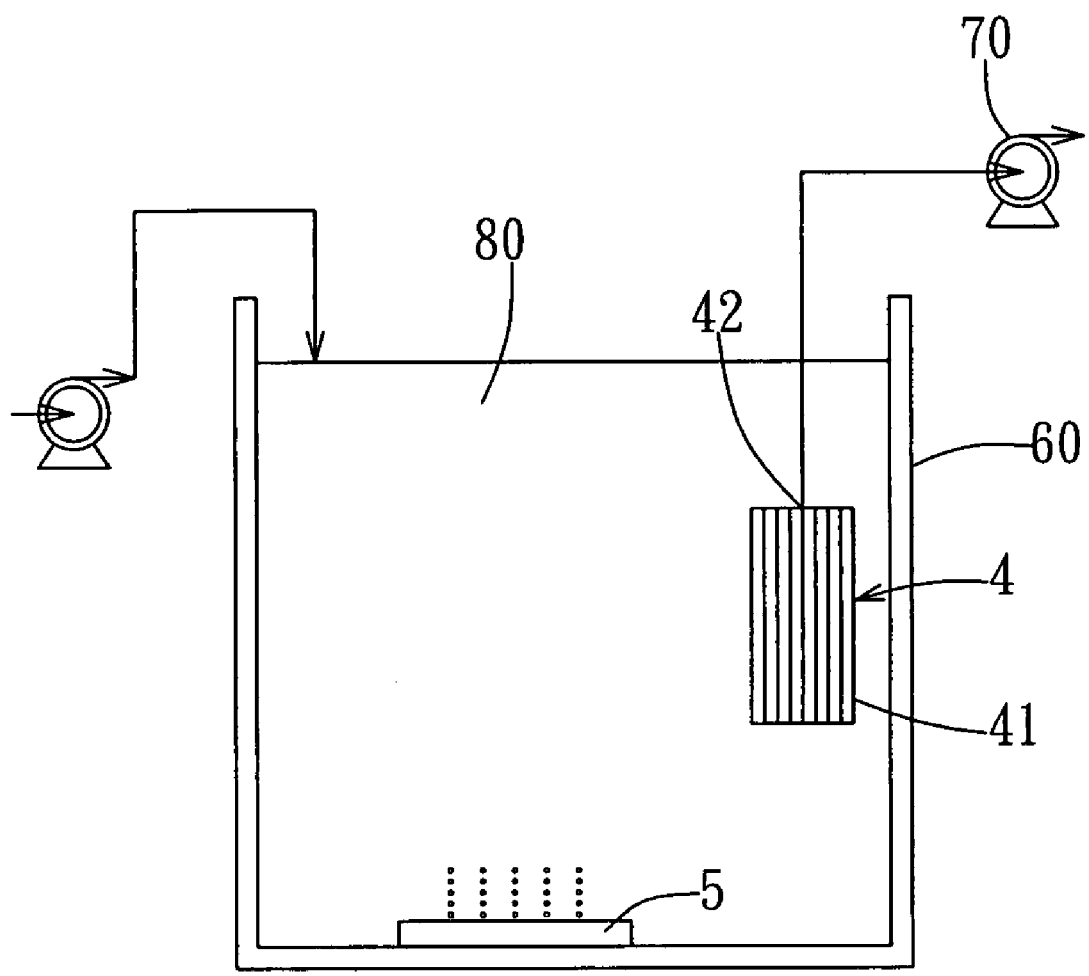
FIG. 5 is a schematic view to illustrate how the flat sheet module is used in a method for treating wastewater according to this invention.

FIG. 5 illustrates how the flat sheet module 4 is used, as an example, in a method for treating wastewater containing active sludge according to this invention. The method includes the steps of disposing the flat sheet module 4 into a body of wastewater 80 containing active sludge in a vessel 60, and driving the wastewater 80 to pass through the flat sheet module 4 using a pump 70 connected to the outlet 42 of the supporting member or the housing 41 of the flat sheet module 4 so as to separate solids from the filtrate.

The merits of the filter media 1, the filter 2, 3, and the flat sheet module 4 made from the same of this invention will become apparent with reference to the following Example and Comparative Example.

EXAMPLE 1

The flat sheet filter 2 of FIG. 2 with a filtering area of 200 cm$^2$ was prepared. The fibrous filtering layer 11 employed for the filter 2 is made from PTFE and has a fiber diameter of 75 nm, a pore diameter of 0.5 μm, and a layer thickness of 18 μm. The non-woven substrate 12 employed for the filter 2 is made from PET and has a fiber diameter of 7.8 μm, a pore diameter of 17 μm, a layer thickness of 0.5 mm, and a bulk density of 250 g/m$^2$. The flat sheet filter 2 thus formed was placed in a 30-liter vessel containing a body of wastewater and active sludge, and was connected to a pump (not shown) for continuous filtering, and wastewater was fed into the vessel for a period of three months. The concentration of the active sludge in the vessel ranged from 8100 to 8500 mg/liter.

COMPARATIVE EXAMPLE 1

The flat sheet filter used for Comparative Example 1 differs from that of Example 1 in that the flat sheet filter is formed solely from the non-woven substrate 12, i.e., without the fibrous filtering layer 11. The flat sheet filter of Comparative Example 1 was also subjected to the same filtering environment as that of Example 1 for three months.

Table 1 shows the performances, in terms of membrane flux (m$^3$/m$^2$·day), transmembrane pressure (Kg/cm$^2$), and membrane permeability (membrane flux per unit of transmembrane pressure), for Example 1 and Comparative Example 1. The results show that Example 1 has a higher membrane flux, and also a higher membrane permeability as compared to those of Comparative Example 1.

TABLE 1

|  | Membrane flux, (m$^3$/m$^2$ · day) | Transmembrane pressure, (Kg/cm$^2$) | Membrane permeability, (flux/pressure) |
| --- | --- | --- | --- |
| Example 1 | 0.4 | 0.4 | 1.0 |
| Comparative Example 1 | 0.15 | 0.2 | 0.75 |

With the inclusion of the fibrous filtering layer 11 in the filter media 1 of this invention, the aforesaid drawbacks associated with the prior art can be alleviated.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A method for treating wastewater containing active sludge, comprising:
    disposing a filter into a body of wastewater containing active sludge, the filter including a supporting member having an outlet, and a filter media enclosing the supporting member and supported by the supporting member so as to have a predetermined firm shape, the filter media including a non-woven substrate and a fibrous filtering layer attached to the non-woven substrate and having a pore diameter ranging from 0.001 to 15 μm and a layer thickness ranging from 10 to 200 μm, the fibrous filtering layer being made from fibers having a fiber diameter ranging from 20 to 1000 nm; and
    driving the wastewater to pass through the filter using a pump connected to the outlet of the supporting member of the filter;
    wherein said fibrous filtering layer is made from polytetrafluoroethylene.

2. The method of claim 1, wherein the fiber diameter of said fibers ranges from 50 to 300 nm.

3. The method of claim 1, wherein the layer thickness of said fibrous filtering layer ranges from 10 to 80 μm.

4. The method of claim 1, wherein said fibrous filtering layer is attached to said non-woven substrate through thermal bonding techniques.

5. The method of claim 1, wherein said fibrous filtering layer is attached to said non-woven substrate through electrostatic spinning techniques.

6. The method of claim 1, wherein said non-woven substrate is made from a material selected from the group consisting of polypropylene, polyethylene, polybutylene terephthalate, polyethylene terephthalate, and combinations thereof.

7. The method of claim 1, wherein said non-woven substrate has a bulk density ranging from 10 to 1000 grams per square meter.

* * * * *